United States Patent [19]

Wallace et al.

[11] Patent Number: 5,059,407
[45] Date of Patent: Oct. 22, 1991

[54] LIQUID CARBON DIOXIDE INJECTION IN EXOTHERMIC CHEMICAL REACTIONS

[75] Inventors: David E. Wallace, Plainfield; Ronald J. Merritello, Chicago; Leonard E. Zyzda, Buffalo Grove; Jacob D. Eisenwasser, Flossmoor; Gary J. Lambesis, Hickory Hills, all of Ill.

[73] Assignee: Liquid Carbonic Corporation, Chicago, Ill.

[21] Appl. No.: 500,719

[22] Filed: Mar. 28, 1990

[51] Int. Cl.$^5$ .............................. C01D 7/00; C01F 5/24
[52] U.S. Cl. ..................................... 423/421; 423/165; 423/189; 423/430; 423/432; 423/DIG. 9; 423/659
[58] Field of Search ............... 423/421, 430, 189, 165, 423/DIG. 9, 432, 437 M, 437 R, 659; 62/386, 4

[56] References Cited

U.S. PATENT DOCUMENTS

| | | | |
|---|---|---|---|
| 3,815,377 | 6/1974 | Tyree, Jr. ............................ | 62/62 |
| 4,022,119 | 5/1977 | Karr ................................... | 99/275 |
| 4,086,010 | 1/1978 | Karr ................................... | 426/477 |
| 4,272,498 | 6/1981 | Faatz ................................. | 423/430 |

FOREIGN PATENT DOCUMENTS 53-16397  2/1978  Japan ................................. 423/430
63-100011 5/1988 Japan ................................. 423/421

Primary Examiner—Gary P. Straub
Assistant Examiner—Timothy C. Vanoy
Attorney, Agent, or Firm—Fitch, Even, Tabin & Flannery

[57] ABSTRACT

The present invention is directed to an improved method for carrying out a exothermic chemical reaction with carbon dioxide in an aqueous environment. In the method, a fluid solution containing at least one chemical reactant which is exothermically reactive with carbon dioxide is provided. Liquid carbon dioxide is then injected into the solution of the chemical reactant at a pressure above the triple point of at least about 60 psig. The injection of the liquid carbon dioxide takes place under turbulent conditions wherein the liquid carbon dioxide expands to provide carbon dioxide vapor. The carbon dioxide vapor superheats to approach the exothermic reaction temperature which occurs between the carbon dioxide vapor and the chemical reactant. The chemical reactant and the carbon dioxide react in the dispersion exothermically to produce a chemical reaction product. The flow rate of liquid carbon dioxide can be controlled to control the reaction temperature without the encessity for providing any reactor cooling or heat exchange apparatus.

17 Claims, 2 Drawing Sheets

LIQUID CARBON DIOXIDE INJECTION IN EXOTHERMIC CHEMICAL REACTIONS

FIELD OF THE INVENTION

The present invention relates generally to an improved method for carrying out a chemical reaction with $CO_2$ in an aqueous environment. More particularly, the present invention relates to the use of liquid carbon dioxide to effect an exothermic chemical reaction, particularly in the manufacture of calcium carbonate.

BACKGROUND OF THE INVENTION

Calcium carbonate is the major constituent of limestone and occurs naturally in two crystalline forms, aragonite and calcite. On heating limestone under controlled calcination conditions, carbon dioxide is driven off leaving calcium and magnesium oxide, otherwise known as quicklime. The effluent carbon dioxide gas has often been associated with the treatment of waste residues from paper manufacturing processes. The discharges from most pulping and paper making processes have a high level of caustic components, particularly in the form of calcium hydroxide. The effluent gases from the calcination of limestone have been used to react with calcium hydroxide to provide precipitated calcium carbonate. The term "precipitated calcium carbonate" generally applies to the commercial types of calcium carbonate produced by chemical means. Paper making processes, which result in the production of discharges having a high level of calcium hydroxide, are sometimes closely associated with the output from a limestone processing plant. The availability of effluent carbon dioxide rich gas is dependent upon the operation of the limestone producing operation at the time that the gas is desired. All methods of production of precipitated calcium carbonate depend upon bringing together calcium ions and carbonate ions under controlled conditions followed by separating, drying and disintegrating or powdering the calcium carbonate so produced and such methods, heretofore, have been dependent upon the use of gaseous carbon dioxide.

A principal use of precipitated calcium carbonate is in the paper making industry as a filler. Paper, as laid down from chemical pulp, does not have the opacity which is necessary for a good print quality where two sides are printed. Paper from ground wood pulp, such as news print, has course fibers which provide a large enough surface area to permit printing without print through. High quality papers from chemical pulping, must be filled to overcome the translucency of these fibers.

The most common fillers are mineral pigments, of which calcium carbonate is a principal pigment. Other pigments include clay, titanium dioxide, hydrated alumina and talc. Calcium carbonate is used in those paper making systems that are neutral or slightly alkaline because it reacts with acid. Among the commonly used fillers, titanium dioxide provides the highest brightness but is extremely expensive. Calcium carbonate is a close second to the titanium dioxide in brightness. One commercial manufacturing process for supplying precipitated calcium carbonate for the paper industry starts with limestone or any naturally occurring calcium carbonate. The natural calcium carbonate contains impurities which are partially removed by calcining and completely removed by later processing steps. The calcining yields calcium oxide and carbon dioxide at the decomposition temperature in the kiln. Limestone is calcined in a kiln to produce quicklime and kiln gases. The quicklime is slaked with water, screened and diluted with addition water to provide milk of lime containing about 70–80 grams of calcium oxide per liter. The kiln gases containing 30% or more carbon dioxide are purified by scrubbing and are then fed into the lime suspension. Contact between liquid and gas is effected by spraying the lime suspension through the carbonating chamber and by use of paddle-type agitators installed at the bottom of the chamber. This system of manufacture allows considerable latitude in control of temperature, concentration of reactants and speed of reaction; factors that may influence the particle size distribution of the calcium carbonate produced and the properties dependent thereon.

The result is a high purity calcium carbonate whose type of crystal and particle size can be controlled by the reaction conditions in the carbonation steps. Theses conditions are optimized for the characteristic most desirable for paper coating.

As indicated above, precipitated calcium carbonate has also been produced as a by-product of the paper making industry by treatment of caustic discharges with gaseous carbon dioxide. Such treatment of the discharge from paper making processes has relied upon the presence of a large amount of gaseous carbon dioxide, usually from a limestone treatment facility, or by vaporization of liquid carbon dioxide. In an integration of a limestone kiln with a paper mill, the clean up of the gases from the limestone kiln is usually not economically justifiable and the resulting precipitated calcium carbonate can be contaminated, resulting in a lower grade of calcium carbonate less desirable for use in the filling of paper. In any event, it has been thought necessary to provide a relatively high quality source of gaseous carbon dioxide to produce the finer grades of precipitated calcium carbonate. The relationship between particle size and brightness is clearly evident with the finer particle sizes often imparting greater brightness to the paper.

In accordance with the present invention, a supplementary source of carbon dioxide is provided for use in the manufacture of precipitated calcium carbonate from the discharge processes of a paper making process. It has been previously proposed to use liquid carbon dioxide in the manufacture of precipitated calcium carbonate by a process involving vaporization of the liquid carbon dioxide prior to contacting the resultant gaseous carbon dioxide with calcium hydroxide to produce the calcium carbonate. Such vaporization was thought to be necessary due to the exothermic reaction between calcium hydroxide and carbon dioxide. In accordance with the present invention, it has been discovered that liquid carbon dioxide can be injected directly into a calcium hydroxide solution to produce precipitated calcium carbonate. The process of the present invention provides benefits of power consumption savings involved in the necessity to vaporize liquid carbon dioxide into gaseous carbon dioxide. A further benefit is that production is not limited by concentration and quantity of lime kiln stack gas which may be available. Supplemental liquid carbon dioxide provides the capability to produce precipitated calcium carbonate as needed on demand in a paper making process. Existing reaction vessels may be used without substantial modification to provide flexibility and increased production.

Accordingly, it is the principal object of the present invention to provide a method for carrying out an exothermic chemical reaction with liquid carbon dioxide in an aqueous environment.

It is another object of the present invention to provide a method for the manufacture of precipitated calcium carbonate utilizing liquid carbon dioxide.

It is further object of the present invention to provide a method for producing precipitated calcium carbonate by direct injection of liquid carbon dioxide to provide a precipitated calcium carbonate product with improved properties for use as a filler in paper making processes.

These and other objects of the invention will become more apparent from the following detailed description and the accompanying drawings wherein:

SUMMARY OF THE INVENTION

The present invention is directed to an improved method for carrying out an exothermic chemical reaction with carbon dioxide in an aqueous environment. In the method, a fluid solution containing at least one chemical reactant which is exothermically reactive with carbon dioxide is provided. Liquid carbon dioxide, at a pressure above the triple point of at least about 60 psig, is then injected into the solution of the chemical reactant. The injection of the liquid carbon dioxide takes place under turbulent conditions wherein the liquid carbon dioxide expands to provide carbon dioxide vapor. The carbon dioxide vapor superheats to approach the exothermic reaction temperature which occurs between the carbon dioxide vapor and the chemical reactant. The chemical reactant and the carbon dioxide react in the dispersion exothermically to produce a chemical reaction product. The flow rate of liquid carbon dioxide can be manipulated to control the reaction temperature without the necessity for providing any reactor cooling or heat exchange apparatus.

DETAILED DESCRIPTION OF THE INVENTION

The method of the invention is particularly suitable for the preparation of calcium carbonate from the caustic discharge resulting from paper manufacturing processes. However, the present invention is equally suitable for the preparation of any chemical which is produced by the exothermic reaction of carbon dioxide with a fluid solution of a chemical reactant. The fluid is preferably water, but any fluid which does not enter into the exothermic chemical reaction may be used. Other suitable fluids include ammonia, and organic solvents, such as ethyl alcohol, benzene and toluene. Typical chemicals which can be produced by the method of the invention are those resulting from the reaction of carbon dioxide with ammonium hydroxide and with any of the soluble alkali metal or alkaline earth metal oxides or hydroxides, including sodium hydroxide, potassium hydroxide, strontium hydroxide, lithium hydroxide and barium hydroxide. For purposes of simplicity, however, the method of the invention will be particularly described hereinbelow with respect to the manufacture of precipitated calcium carbonate.

Figure 1:
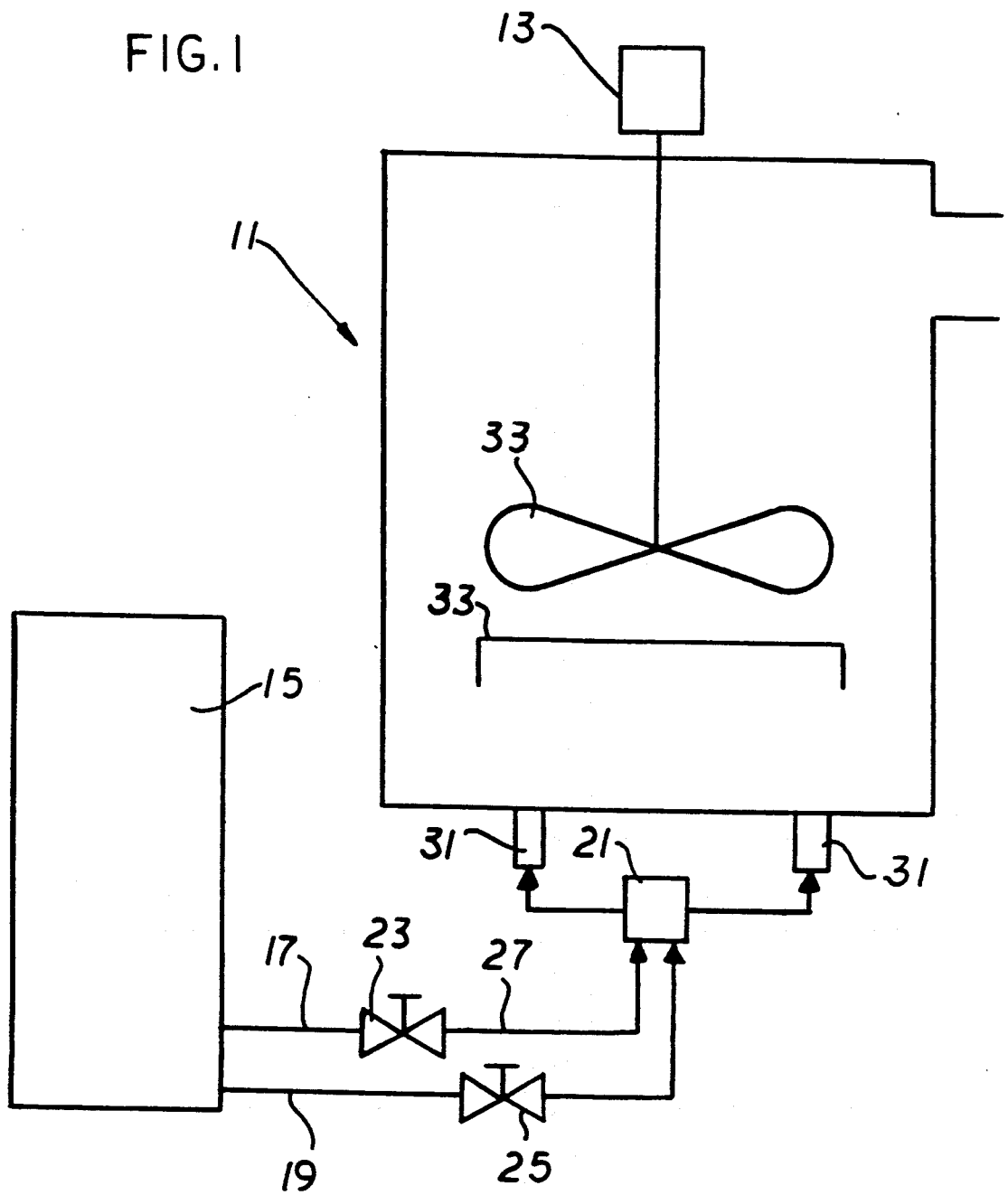
FIG. 1 is a cross-sectional schematic diagram of apparatus useful in the method of the invention for producing calcium carbonate.

In accordance with the invention, a charge of a caustic solution of calcium hydroxide is introduced into a chemical reactor. The calcium hydroxide or other chemical reactant is preferably present in the charge at a level of from about 2% to about 50%. All percentages used herein are by weight unless otherwise indicated. The size of the chemical reactor is not critical and may range from small experimental reactors of a few gallons to industrial treatment chemical reactors of several thousand gallons. As shown in FIG. 1, the reactor vessel 11 is a common continuous stirred tank reactor which contains an agitating device 13. A storage tank 15 for liquid carbon dioxide is provided with a liquid carbon dioxide line 17 and a vapor carbon dioxide line 19. Liquid carbon dioxide can be distributed in high pressure uninsulated steel cylinders or as a refrigerated low pressure liquid in insulated truck trailers. Carbon dioxide can be removed from the cylinder or the truck trailer as liquid carbon dioxide or can be removed as carbon dioxide gas by reducing the pressure. The carbon dioxide vapor line 19 is used as a purge gas to maintain line pressure above the triple point to prevent dry ice formation ahead of manifold 11. The liquid carbon dioxide vapor and the carbon dioxide are led to a manifold 21 through liquid valve 23 and vapor valve 25. The liquid carbon dioxide used in effecting, the reaction is led through conduit 27 to manifold 21 which supplies two or more injection valves 31. The injection valves 31 are any suitable pressure actuated valves, such as those described in U.S. Pat. No. 3,815,377 to Tyree.

While not wishing to be bound by any theory, it is believed that the liquid carbon dioxide exits from the valve and expands to carbon dioxide snow and vapor with extreme turbulence. It is believed that the carbon dioxide snow instantaneously sublimes to saturated vapor and rises upwards through the reactor vessel past a baffle 33. The baffle 33 acts to disperse the carbon dioxide vapor out to the periphery of the tank. The agitating device 13 includes a propeller type stirrer 33 which is activated to provide turbulent and thorough mixing of the carbon dioxide vapor with the calcium hydroxide slurry.

The concept of using liquid carbon dioxide in a reactor vessel to effect reaction with a chemical reactant which produces an exothermic reaction with carbon dioxide is surprising and novel. It was believed that the low temperature of liquid carbon dioxide would choke or slow such exothermic reactions. Instead, surprisingly, by varying the rate of introduction of the liquid carbon dioxide, the low temperature of the expanded carbon dioxide vapor can be used to control the speed and temperature of the exothermic reaction without requiring the use of insulating materials or heat transfer apparatus.

Preferably, the fluid solution of the chemical reactant in the tank is maintained at a pressure of from about atmospheric to about 200 psig during the reaction. Most preferably, the pressure in the reaction vessel is at about atmospheric pressure. Liquid carbon dioxide can, of course, be at any temperature and pressure above the triple point of carbon dioxide, which is −5° C. and a pressure of 60 psig up to the critical temperature of 31° C. and a pressure of 1051 psig. Practically, however, it is preferred to maintain the pressure of the liquid carbon dioxide in the range of from between about 150 psig and about 350 psig.

In the treatment of caustic calcium hydroxide, the starting temperature of the calcium hydroxide solution is typically about ambient temperature. During the exothermic reaction to produce calcium carbonate by reaction with carbon dioxide, the temperature rises to within the range of from about 80° C. to about 100° C. during a reaction time of from about 30 minutes to about 200 minutes. The exothermic reaction generates sufficient heat to vaporize the liquid carbon dioxide. More specifically, the exothermic reaction preferably liberates at least about 300 BTU per pound of the reaction product.

The process of the present invention for producing precipitated calcium carbonate and other alkali metal and alkaline earth carbonates produces a superior product having a particle size within a narrow size range of from about 1 to about 10 microns, with a particle size distribution such that at least about 50% of the particles fall within 50% of the average diameter, about 90% of the particles are less than about 4 microns and habout 10% of the particles are less than about 2 microns. The process of the invention produces calcium carbonate crystals having an optical TAPPI brightness of at least about 80-90 and a 75 gloss of about 20-40%.

Figure 2:
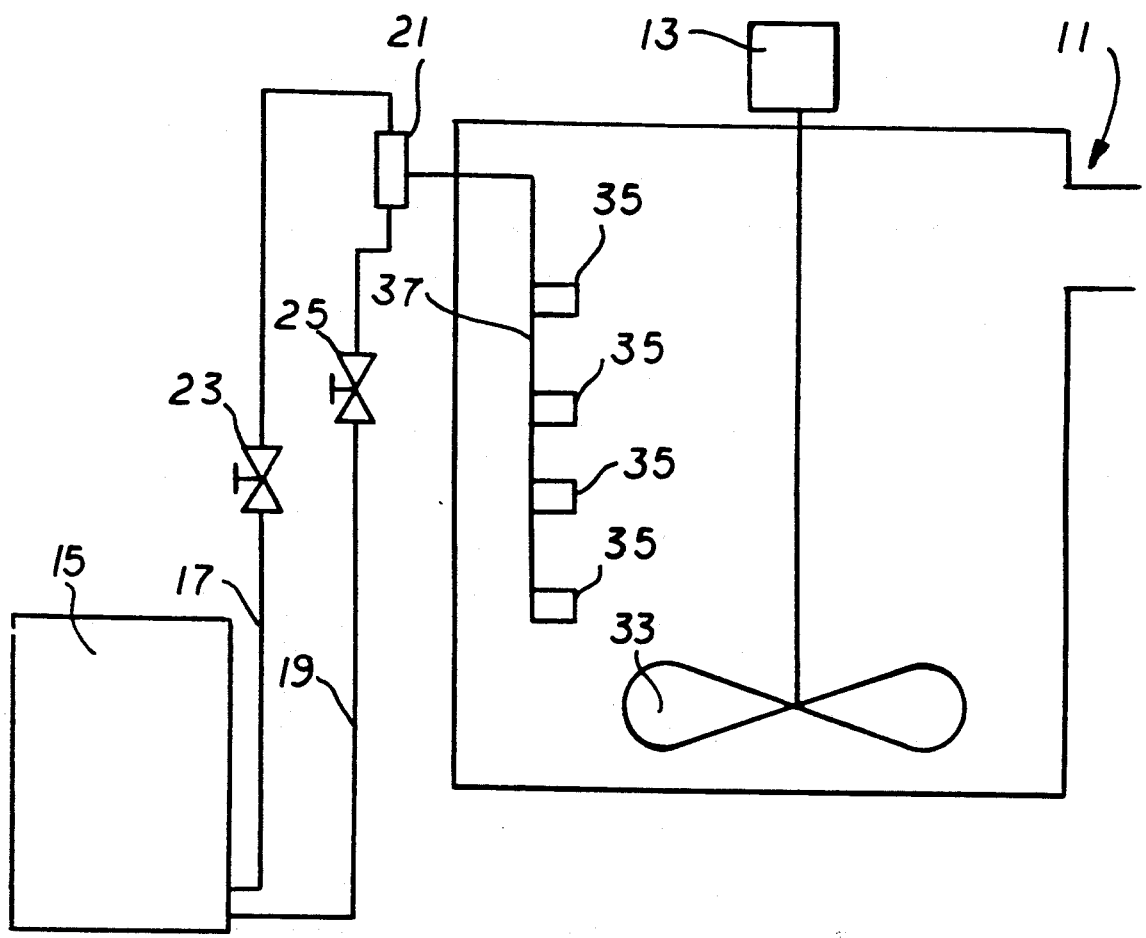
FIG. 2 is a cross-sectional schematic diagram of a further embodiment of apparatus useful in the method of the invention for producing calcium carbonate.

In an alternate embodiment of the invention, as shown in FIG. 2, pressure reducing valves 35 are attached to a stalk of stainless steel conduit 37 Which extends downwardly from the top of the reaction vessel. The carbon dioxide liquid is then injected throughout a substantial vertical length of the reaction vessel. As many reducing valves 35 as needed can be located on the stalk. In general, from 2 to 7 reducing valves are used in this embodiment.

The following example further illustrates various features of the invention but is intended to in no way limit the scope of the invention which is defined in the appended claims.

EXAMPLE 1

The apparatus shown in FIG. 1 was used to produce calcium carbonate from a calcium hydroxide slurry. A charge of calcium hydroxide was introduced into the tank. Liquid carbon dioxide was introduced into the tank from a vessel containing about 39,200 pounds of liquid carbon dioxide. The trailer liquid level gauge on the tank car containing the liquid carbon dioxide initially read 87% of capacity. At time equal zero, the minimum manifold pressure was 230 psig with a fully open liquid carbon dioxide valve. After 75 minutes the manifold pressure was reduced to 200 psig. Liquid carbon dioxide was delivered at a rate of 50 pounds of liquid carbon dioxide per minute and the reaction temperature was judged to be increasing too fast due to the exothermic reaction. After 180 minutes, the manifold pressure was still maintained at 200 psig and a final batch temperature in the reaction vessel of 80° C. was attained. An end point from the reaction was determined by monitoring the conductivity of the precipitated calcium carbonate product. The conductivity curve typically decreases gradually at a steady rate then suddenly drops to an end point. The reaction is immediately stopped and the final product is pumped out of the reaction vessel for analysis and delivered to a production plant where applicable.

In the present example, the final batch temperature was 80° C. and the end point occurred after 180 minutes from start. The final trailer liquid level gauge equaled 70% of capacity. The carbon dioxide requirement based on theoretical precipitated calcium carbonate produced was estimated at 8800 pounds of liquid carbon dioxide. The particle size was judged to be too fine for use as a filler grade precipitated calcium carbonate. 1.8 microns calcite crystals is the minimum specification for filler grade precipitated calcium carbonate used for copier paper. Since the fine product did not meet minimum specification, the product was blended with another batch to meet requirements and was sent to a paper plant.

EXAMPLE 2

In a second example, utilizing the apparatus of FIG. 1, a charge of calcium hyroxide was introduced into the tank 11. At time equals zero, the minimum manifold pressure of 190 psig was attained by partially throttling the inlet valve. The pressure was maintained constant at 190 psig. The trailer liquid level gauge showed 70% at the start. At a time of 205 minutes from the start, the manifold pressure was still 190 psig and the trailer liquid level gauge equaled 52%. 18% of the trailer capacity was used for the test in accordance with the liquid level gauge readings. The carbon dioxide requirement based on theoretical precipitated calcium carbonate produced was estimated at 8800 pounds of liquid carbon dioxide. The particle size distribution attained was coarser than that of Example 1 but was still too fine for use as filler grade calcium carbonate.

EXAMPLE 3

A charge of calcium hydroxide was introduced into the tank 11. At time equals zero, the manifold pressure was adjusted to 190 psig and the liquid level gauge of the tank was 52%. At 208 minutes, the trailer liquid level gauge was 34%. The product was judged to be suitable for use in accordance with the minimum specification for filler grade precipitated calcium carbonate used for copier paper.

Carbon dioxide vapor was not visible in the exhaust stack of any of the examples made with liquid carbon dioxide although carbon dioxide vapor was visible in the exhaust stack using normal lime kiln stack gas. This indicates that carbon dioxide was not present in the exhaust stack when liquid carbon dioxide was utilized in sufficient concentration to form a white cloud in cold 23° F. ambient temperature. This indicates that liquid carbon dioxide is efficiently reacting in the carbonating vessel, with negligible losses in the exhaust stack.

The product produced with liquid carbon dioxide had increased brightness in comparison with precipitated calcium carbonate produced with lime kiln stack gas.

We claim:

1. A method of carrying out an exothermic chemical reaction with $CO_2$, which method comprises providing a fluid solution of at least one chemical reactant selected from the group of metal oxides and hydroxides, in a reaction vessel, and injecting liquid $CO_2$ into said solution wherein said liquid $CO_2$ expends to $CO_2$ vapor in said reaction vessel and said $CO_2$ reacts exothermically with said chemical reactant in said solution, to provide a chemical reaction product.

2. A method according to claim 1 wherein said reaction is carried out at about atmospheric pressure and said liquid $CO_2$ is injected at a pressure between about 60 psig and about 1050 psig.

3. A method according to claim 1 wherein said liquid carbon dioxide is injected at a pressure of from about 150 psig and about 350 psig.

4. A method according to claim 1 wherein said exothermic reaction liberates sufficient heat to vaporize said liquid $CO_2$.

5. A method according to claim 4 wherein said exothermic reaction liberates at least about 300 BTU per pound of reaction product.

6. A method according to claim 1 wherein an alkali metal oxide or an alkaline earth metal oxide is supplied to provide the chemical reactant.

7. A method in accordance with claim 1 wherein an oxide selected from the group consisting of sodium oxide, potassium oxide, calcium oxide, strontium oxide, lithium oxide and barium oxide is supplied to provide the chemical reactant.

8. A method according to claim 1 wherein said chemical reactant is an alkali metal hydroxide or an alkaline earth metal hydroxide.

9. A method according to claim 1 wherein said fluid is selected from water, ethyl alcohol, benzene and toluene 10. A method according to claim 1 wherein said solution is an aqueous solution of $Ca(OH)_2$ having from about 2% to about 50% by weight of $Ca(OH)_2$.

11. A method in accordance with claim 9 wherein said fluid is water.

12. A method of producing precipitated calcium carbonate which improves brightness and opacity of high quality alkaline paper products, which method comprises providing an aqueous solution containing calcium hydroxide, and injecting liquid $CO_2$ through an injection valve into said solution, said liquid $CO_2$ being at a pressure between 60 psig and about 1050 psig prior to said injection, said injection of said $CO_2$ producing turbulent conditions, wherein said liquid $CO_2$ expands to $CO_2$ snow and vapor and said reaction temperature, wherein said calcium hydroxide and said $CO_2$ react exothermically to produce calcium carbonate which precipitates from said solution in the form of discrete crystal particles.

13. A method according to claim 12 wherein said solution increases from an initial ambient temperature to a temperature of from about 80° C. to about 100° C. during a reaction time of between about 30 minutes to about 200 minutes.

14. A method according to claim 12 wherein said precipitated calcium carbonate crystals have an optical TAPPI brightness of about 80-90 or greater, and a 75 gloss of about 20 to 40%.

15. A method according to claim 12 wherein said precipitated calcium carbonate calcite crystals have an average particle size of about 1 to 10 microns with a particle size distribution where at least about 50% of said particles fall within 50% of the average diameter, and about 90% or more of said particles are finer than about 4 microns, and about 10% of said particles are finer than about 2 microns.

16. A method in accordance with claim 12 wherein said liquid carbon dioxide is injected at a pressure of from about 150 psig to about 350 psig.

17. An improved method of carrying out an exothermic chemical reaction with $CO_2$, which method comprises providing a fluid solution of at least one chemical reactant potassium hydroxide, calcium hydroxide, strontium hydroxide, lithium hydroxide and barium hydroxide in a reaction vessel, and injecting liquid $CO_2$ into said solution wherein said liquid $CO_2$ expands to $CO_2$ vapor in said reaction vessel and said $CO_2$ reacts exothermically with said chemical reactant in said solution, to provide a chemical reaction product.

* * * * *

UNITED STATES PATENT AND TRADEMARK OFFICE
CERTIFICATE OF CORRECTION

PATENT NO. : 5,059,407

DATED : October 22, 1991

INVENTOR(S) : Wallace, et al.

It is certified that error appears in the above-identified patent and that said Letters Patent is hereby corrected as shown below:

Abstract, line 19, delete "encessity" and substitute therefor --necessity--.

Column 4, line 65, delete "-5° C." and substitute therefor -- -57° C.--.

Column 5, line 22, delete "habout" and substitute therefor --about--.

Column 5, line 26, delete "75" and substitute therefor --75°--.

Claim 1, Column 6, line 61, delete "expends" and substitute therefor --expands--.

Claim 12, Column 8, line 1, after "and said" insert --snow sublimes to vapor and superheats to approach the exothermic--.

Claim 14, Column 8, line 13, delete "75" and substitute therefor --75°--.

UNITED STATES PATENT AND TRADEMARK OFFICE
CERTIFICATE OF CORRECTION

PATENT NO. : 5,059,407

DATED : October 22, 1991

INVENTOR(S) : Wallace, et al

It is certified that error appears in the above-identified patent and that said Letters Patent is hereby corrected as shown below:

Claim 17, Column 8, line 30, after "reactant" insert
--selected from the group consisting of sodium hydroxide,--.

Signed and Sealed this

Twenty-seventh Day of April, 1993

Attest:

MICHAEL K. KIRK

Attesting Officer

Acting Commissioner of Patents and Trademarks